United States Patent
Nguyen et al.

[19]

[11] Patent Number: 5,887,163
[45] Date of Patent: Mar. 23, 1999

[54] METHOD AND APPARATUS FOR PROVIDING DUAL BOOTING CAPABILITIES TO A COMPUTER SYSTEM

[75] Inventors: Trung K. Nguyen, Cypress; Catherine Abueg Schwartz; Crispin R. Jose, both of Houston; Matthew P. Tran, Houston, all of Tex.

[73] Assignee: Compaq Computer Corporation, Houston, Tex.

[21] Appl. No.: 834,495

[22] Filed: Apr. 4, 1997

[51] Int. Cl.[6] .................................................. G06F 9/06
[52] U.S. Cl. ........................................ 395/652; 395/712
[58] Field of Search ................................. 395/712, 651, 395/652, 653, 682

[56] References Cited

U.S. PATENT DOCUMENTS 5,694,600 12/1997 Khenson et al. ......................... 395/652
5,748,957 5/1998 Klein ....................................... 395/652
5,794,052 8/1998 Harding .................................. 395/651

OTHER PUBLICATIONS

J. David Bryan, Direct Boot Into WinNT/Win95/DOS, Nov. 13, 1995.
BootPart 2.0: Boot Partition for WinNT.
G. Vollant, Bootpart.txt–text file of Boot Partition 2.0 for WinNT.

Primary Examiner—Kevin A. Kriess
Attorney, Agent, or Firm—Beyer & Weaver, LLP

[57] ABSTRACT

A method for providing dual booting capabilities to a computer system is disclosed. The invention facilitates the installation of a plurality of operating systems on a computer system in any order such that the computer system is able to boot from any of the installed operating systems. The invention is particularly well suited for providing dual booting capabilities in both a DOS-based operating system and Windows NT when the DOS-based operating system is installed on the computer system subsequent to installation of Windows NT.

20 Claims, 9 Drawing Sheets

| Offset | Field |
|---|---|
| 00h – 03h | H9 XX XX or KB XX 90 |
| | OKM name and version (8 bytes) |
| 0Bh – 0Dh | Bytes per sector (2 bytes) |
| 0Dh | Sectors per allocation unit (1 byte) |
| 0Eh – 10h | Reserved sectors, starting at 0 (2 bytes) |
| 10h | Number of FATs (1 byte) |
| 11h – 13h | Number of root-directory entries (2 bytes) |
| 13h – 15h | Total sectors in logical volume (2 bytes) |
| 15h | Media descriptor byte |
| 16h – 18h | Number of sectors per FAT (2 bytes) |
| 18h – 1Ah | Sectors per track (2 bytes) |
| 1Ah – 1Ch | Number of heads (2 bytes) |
| 1Ch – 20h | Number of hidden sectors (4 bytes) |
| 20h – 24h | Total sectors in Logical volume (4 bytes) |
| 24h | Physical drive number |
| 25h | Rerserved |
| 26h – 27h | Extended boot signature record (29H) |
| 27h – 2Bh | 32-bit binary volume ID |
| 2Bh – 36h | Volume Label (11 bytes) |
| 36h – 3Eh | Reserved (8 bytes) |
| 3Eh | Bootstrap routine |

FIG. 2B

METHOD AND APPARATUS FOR PROVIDING DUAL BOOTING CAPABILITIES TO A COMPUTER SYSTEM

BACKGROUND OF THE INVENTION

1. Field of the Invention

The present invention relates to providing multiple operating systems on a computer system and, more particularly, to dual booting operating systems on a computer system.

2. Description of the Related Art

Conventionally, many user's of computer systems desire the ability to use multiple operating systems on their computer system. Such user's normally prefer that the multiple operating system be both installed on the computer system and bootable. With such a configuration, the user simply chooses which of the multiple operating systems to use each time the computer system begins its boot up sequence.

With respect to personal computers, operating system are installed on the physical hard drives of the personal computers. FIG. 1. is a schematic diagram of a representative physical hard drive 100. The physical hard drive 100 includes a primary partition 102 and other partitions 104. The primary partition 102 is a portion of the physical hard drive 100 that has been marked as bootable by an operating system (e.g., DOS, Windows, Windows NT) that has been installed on the computer system. Hence, when a computer system boots up from the physical hard drive 100, the primary partition 102 causes the installed operating system to be loaded into random-access memory (RAM) of the computer system. Thereafter, the computer system may store and obtain data from the other partitions 104 of the physical hard drive 100.

Each of the partitions 102 and 104 of the physical hard drive 100 include a plurality of sectors as is well known in the art. Specifically, the primary partition 102 will include a boot sector from which the operating system is booted when the computer system is turned on or reset. Typically, the boot sector is the first sector within the primary partition 102. The boot sector is typically written when the operating system is installed on the computer system. The other partitions 104 store various other data (e.g., data files, application program files) that are stored on the physical hard drive.

To provide dual booting of two or more operating systems on a computer system, the two or more operating systems must be installed on the computer system. Given that a computer system boots up from a boot sector in the primary partition of a physical hard drive, providing dual booting capabilities can be problematic. For example, the installation of Windows NT and a DOS-based operating system on a computer system is known to be problematic.

Although the installation of Windows NT after previous installation of a DOS-based operating system is effective because Windows NT has a dual boot capability, the installation of a DOS-based operating system after previous installation of Windows NT is not effective because DOS-based operating systems do not have a dual boot capability. Therefore, when a DOS-based operating system is installed after previous installation of Windows NT, the DOS-based operating system is not bootable and thus the computer system does not have the desired dual boot capability.

A known technique exists to solve the problem which occurs when a DOS-based operating system is installed on a computer system after the installation of Windows NT. The known technique involves using an emergency repair disk (for Windows NT) to restore Windows NT. Although this known technique is effective at providing the desired dual boot capability, this solution is inconvenient and burdensome on the user because it requires the user create and safeguard an emergency repair disk when Windows NT is first installed, and then thereafter to make use of the emergency repair disk to restore Windows NT.

Thus, there is a need for an improved approach to providing dual booting capabilities to a computer system.

SUMMARY OF THE INVENTION

Broadly speaking, the invention is a method and apparatus for providing dual booting capabilities to a computer system. The invention facilitates the installation of a plurality of operating systems on a computer system in any order such that the computer system is able to boot from any of the installed operating systems. The invention is particularly well suited for providing dual booting capabilities in both a DOS-based operating system and Windows NT when the DOS-based operating system is installed on the computer system subsequent to installation of Windows NT.

The invention can be implemented in numerous ways, including as a method, as an apparatus, and as computer readable code on a computer readable medium. Several embodiments of the invention are summarized below.

As a method for installing a DOS-based operating system on a computer system after installation of a Windows NT operating system, one embodiment of the invention includes the operations of: retrieving a DOS boot sector from a DOS diskette, the DOS boot sector including at least a bootstrap routine for booting in DOS; retrieving an installed boot sector from a boot drive of a computer system, the installed boot sector including drive information; merging the DOS boot sector with the installed boot sector to produce a modified boot sector; replacing the installed boot sector with the modified boot sector; and copying certain files from the DOS diskette to predetermined entries in a root directory of the boot drive.

As a method for installing a second operating system on a computer system after a first operating system has been previously installed, another embodiment of the invention includes the operations of: retrieving an uninstalled boot sector including at least second drive information and a bootstrap routine for booting the computer system in the second operating system; retrieving an installed boot sector from a boot drive of the computer system, the installed boot sector including at least first drive information, the installed boot sector being used to boot the computer system in the first operating system; merging the uninstalled boot sector with the installed boot sector to produce a modified boot sector; and replacing the installed boot sector with the modified boot sector.

As a computer readable medium containing program instructions for installing a DOS-based operating system on a computer system after installation of a Windows NT operating system, an embodiment of the invention includes: computer readable code for retrieving a DOS boot sector from a DOS diskette, the DOS boot sector including at least a bootstrap routine for booting in DOS; computer readable code for retrieving an installed boot sector from a boot drive of a computer system, the installed boot sector including drive information; computer readable code for merging the DOS boot sector with the installed boot sector to produce a modified boot sector; computer readable code for replacing the installed boot sector with the modified boot sector; and computer readable code for copying certain files from the DOS diskette to predetermined entries in a root directory of the boot drive.

The invention has numerous advantages. One advantage of the invention is that it allows users to conveniently provide dual boot capability on their computer systems.

In particular, with respect to Windows NT and a DOS-based operating system, the invention provides flexibility and convenience to the user such that there is no longer any restriction on the order in which the operating systems are installed on the computer system. Another advantage of the invention is that a user need not maintain and utilize a repair disk to correct deficiencies in the subsequently installed operating systems.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2B illustrates an example of a boot sector format for MS-DOS;

DETAILED DESCRIPTION OF THE INVENTION

Embodiments of the invention are discussed below with reference to FIGS. 2A–7. However, those skilled in the art will readily appreciate that the detailed description given herein with respect to these figures is for explanatory purposes as the invention extends beyond these limited embodiments.

The invention relates to a method for providing dual booting capabilities to a computer system. The invention facilitates the installation of a plurality of operating systems on a computer system in any order such that the computer system is able to boot from any of the installed operating systems. The invention is particularly well suited for providing dual booting capabilities in both a DOS-based operating system and Windows NT when the DOS-based operating system is installed on the computer system subsequent to installation of Windows NT.

Generally speaking, four files are needed to boot up MS-DOS under Windows NT. These files need to be placed in the root directory in the primary boot partition of a physical hard drive. These four files are BOOTSECT.DOS; IO.SYS; MSDOS.SYS; and COMMAND.COM. MS-DOS will not boot successfully if these four files are merely copied to the root directory of the physical hard drive. More particularly, due to backwards compatibility issues, the BOOTSECT.DOS file must contain pertinent information about the boot drive at bytes (e.g., 0x03 to 0x3E) of the boot sector of the physical hard drive, and the files IO.SYS and MSDOS.SYS files must be the first two files in the root directory on the physical hard drive. The invention operates to insure these two conditions are met.

Figure 1:
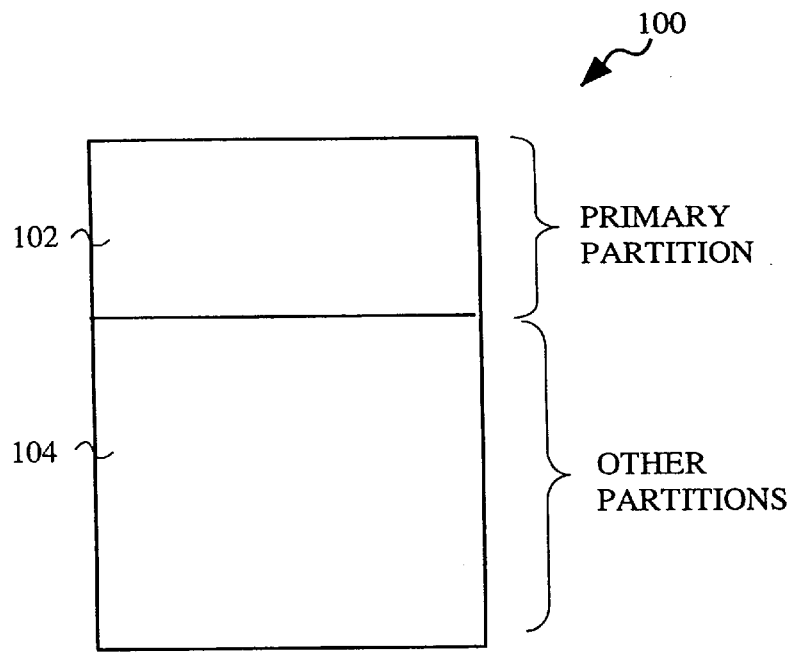
FIG. 1. is a schematic diagram of a representative physical hard drive.
Figure 2A:
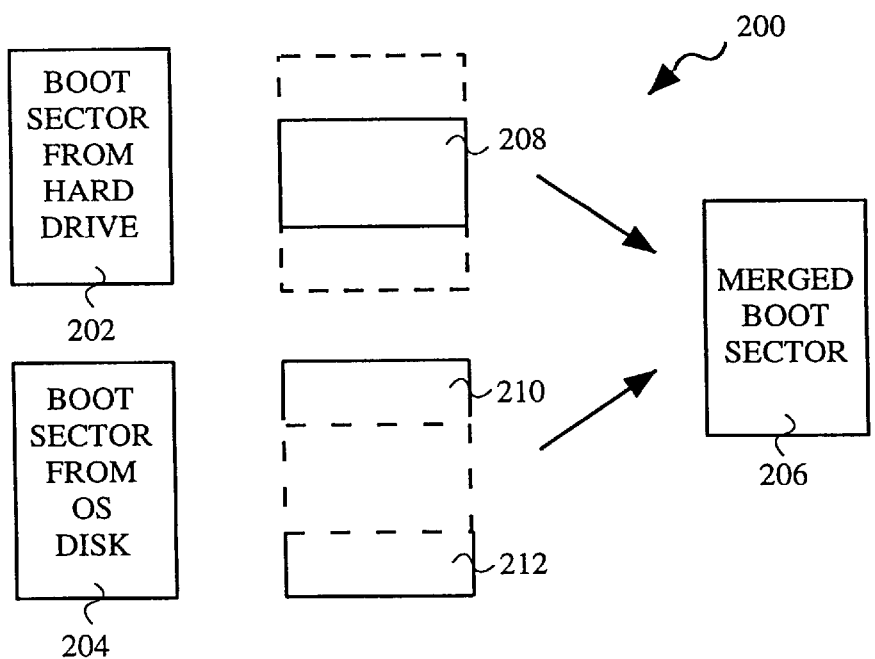
FIG. 2A is a diagram illustrating boot sector modification in accordance with one embodiment of the invention.

FIG. 2A is a diagram illustrating boot sector modification 200 in accordance with one embodiment of the invention. The boot sector modification 200 begins by obtaining an existing boot sector from the physical hard drive of the computer system. In addition, a boot sector 204 from an operating system disk is obtained. The boot sector 202 from the physical hard drive is then merged with the boot sector 204 from the operating system disk so as to produce a merged boot sector 206. In forming the merged boot sector 206, a disk drive information portion 208 of the boot sector 202 is utilized and merged with portions 210 and 212 (and not disk drive information) from the boot sector 204. The merged boot sector 206 thus includes the disk drive information portion 208 of the boot sector 202 together with the portions 210 and 212 of the boot sector 204. The portion 212 of boot sector 204 can, for example, contain a bootstrap routine for the operating system obtained from the operating system disk.

In one embodiment of the invention, an existing operating system installed on a computer system is Windows NT and the additional operating system to be subsequently installed to facilitate dual booting is MS-DOS. In such an embodiment, the boot sector modification 200 creates a BOOTSECT.DOS file as required for MS-DOS to be bootable from the computer system. The BOOTSECT.DOS file is the merged boot sector 206. Once the BOOTSECT.DOS file is created, the file is placed in the boot sector of the physical hard drive of the computer system so that the computer system can boot up into MS-DOS or Windows NT. A BOOT.INI file of Windows NT is automatically modified so as to provide a user a choice of the MS-DOS or Windows NT operating system during the initial portion of the boot up sequence. Also, the physical hard drive needs to be a FAT format, not a NTFS format.

FIG. 2B illustrates an example of a boot sector 214 format for MS-DOS. As an example, the boot sector 214 can be the boot sector 204 obtained from an operating system disk. The MS-DOS boot sector 214 is a 512 byte sector that is usually stored in a first sector of the primary partition. Bytes 0x0B through 0x3E of the MS-DOS boot sector 214 contain boot drive information. The boot drive information is created when the physical hard drive is formatted. However, in accordance with the invention, the boot drive information for the MS-DOS boot sector 214 is obtained from the existing boot sector for the computer system and merged with other portions of the MS-DOS boot sector 214 from the operating system disk so that the necessary boot drive information is properly contained within the resulting boot sector (see FIG. 2A).

Figure 2C:
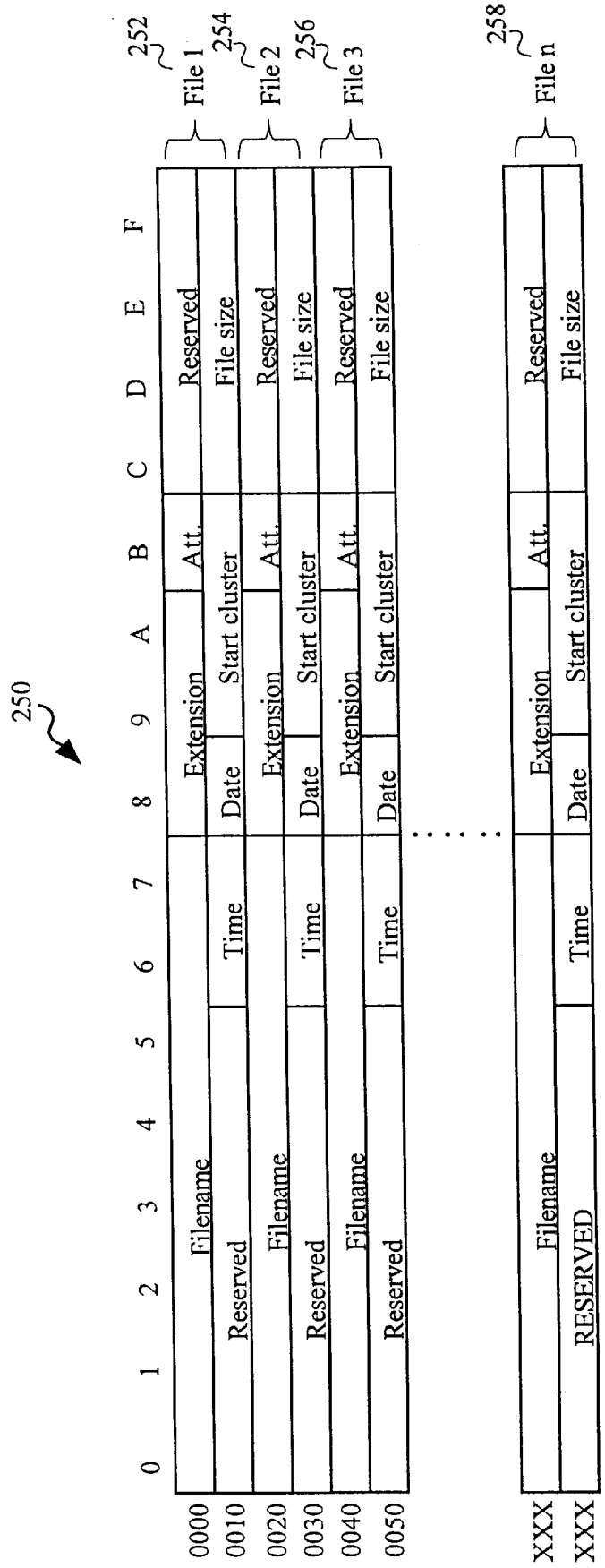
FIG. 2C illustrates an exemplary structure for the entries in a root directory.

Furthermore, the IO.SYS and MSDOS.SYS files obtained from the operating system disk must be placed in the root directory of the physical hard drive as the first two file entries. FIG. 2C illustrates an exemplary structure 250 for the entries 252–258 in a root directory. For example, the entries may be 32-byte entries that describe the files, subdirectories, and optional volume labels within the root directories. These entries may also describe where the file or subdirectory resides, namely a start cluster. Further, if the file or directory is deleted, then the first byte from its entry contains a value of 0xE5. The logical end-of-directory is designated with a null value or 0x00 in the first byte, and signals that all subsequent entries have never been used.

Whenever the MS-DOS boot sector is loaded into memory, it executes the bootstrap code. The bootstrap code checks if the computer system contains a copy of MS-DOS. The computer system performs this check by determining whether or not the first two files in the root directory are the systems files IO.SYS and MSDOS.SYS, in that order, from the first sector of the root directory. Accordingly, it is critical that the IO.SYS and MSDOS.SYS reside in the first two entries in the root directory.

Given that these first two entries of the root directory may be occupied by files already in use by the computer system (e.g., due to prior installation of another operating system on the computer system), the first two entries of the root directory (should they be occupied) must be rearranged so that they are empty when the needed MS-DOS files (i.e., IO.SYS and MS-DOS.SYS) are copied over to the first two entries of the root directory.

Figure 3:
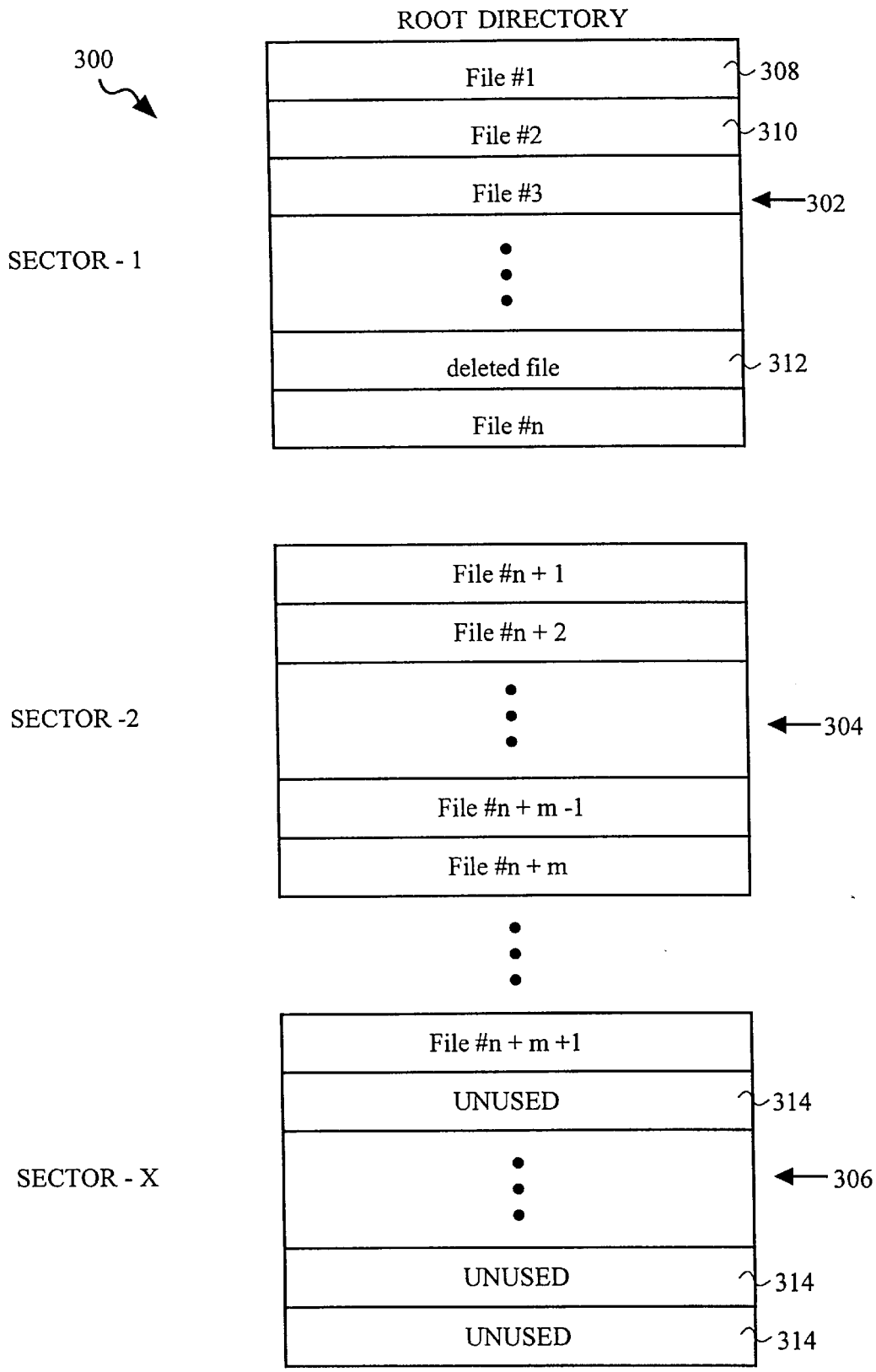
FIG. 3 illustrates an example of a root directory of a physical hard drive prior to the installation of a DOS-based operating system.

FIG. 3 illustrates an example of a root directory 300 of a physical hard drive prior to the installation of a DOS-based operating system. The root directory 300 includes a total of x sectors, including sector-1 302, sector-2 304 and sector-x 306. The first entry of the sector-1 302 is file#1 308. The second entry in the sector-1 302 is file#2 310. Hence, in this example, the first and second entries of the sector-1 302 are occupied. Further, the root directory 300 also indicates that a deleted file 312 is contained in an entry of the sector-1 302, that all entries of the sector-2 304 are occupied, and that various unused entries 314 are present in the sector-x 306.

Figure 4:
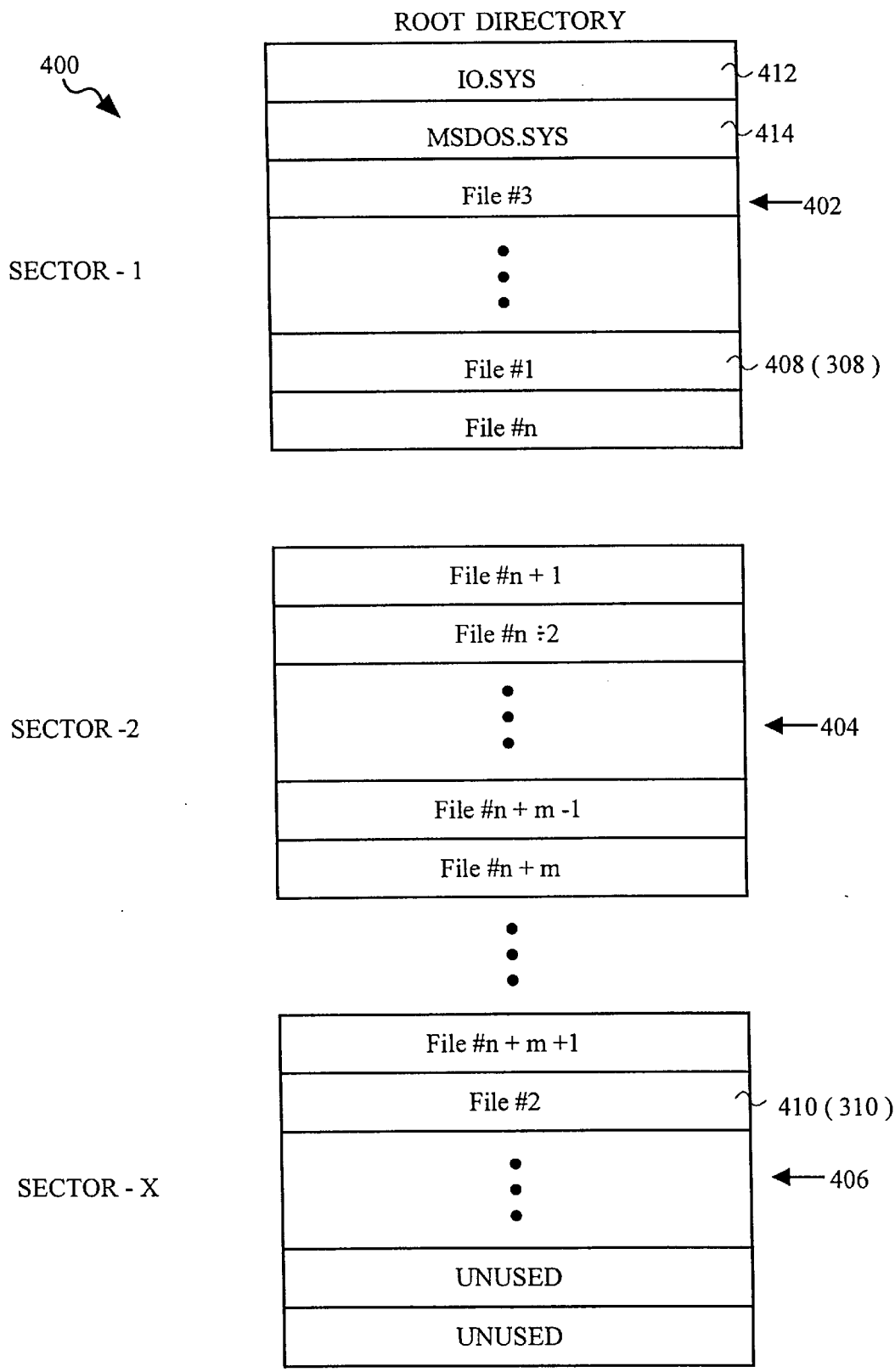
FIG. 4 illustrates an example of a root directory after the installation of a DOS-based operating system according to the invention.

FIG. 4 illustrates an example of a root directory 400 after the installation of a DOS-based operating system according to the invention. The root directory 400 is the same root directory as the root directory 300 illustrated in FIG. 3, though the DOS-based operating system files IO.SYS and MS-DOS.SYS files have been added to the root directory. More particularly, the file#1 308 that was the first entry in the sector-1 302 illustrated in FIG. 3 is now in the entry 408 of the sector-1 402. By moving the file#1 308 to the entry 408, the DOS-based operating system file IO.SYS is now able to be placed in the first entry 412 of the sector-1 402. Moreover, the file#2 310 that was previously in the second entry of the sector-1 302 is now in an entry 410 of the sector-x 406 of the root directory 400. Hence, by moving file#2 310 to the sector-x 406, the DOS-based operating system file MS-DOS.SYS can be placed in the entry 414 of the sector-1 402. Accordingly, the first two entries of the sector-1 402 of the root directory 400 are now arranged such that the IO.SYS and MS-DOS.SYS files are placed in the first and second entries 412 and 414.

Figure 5:
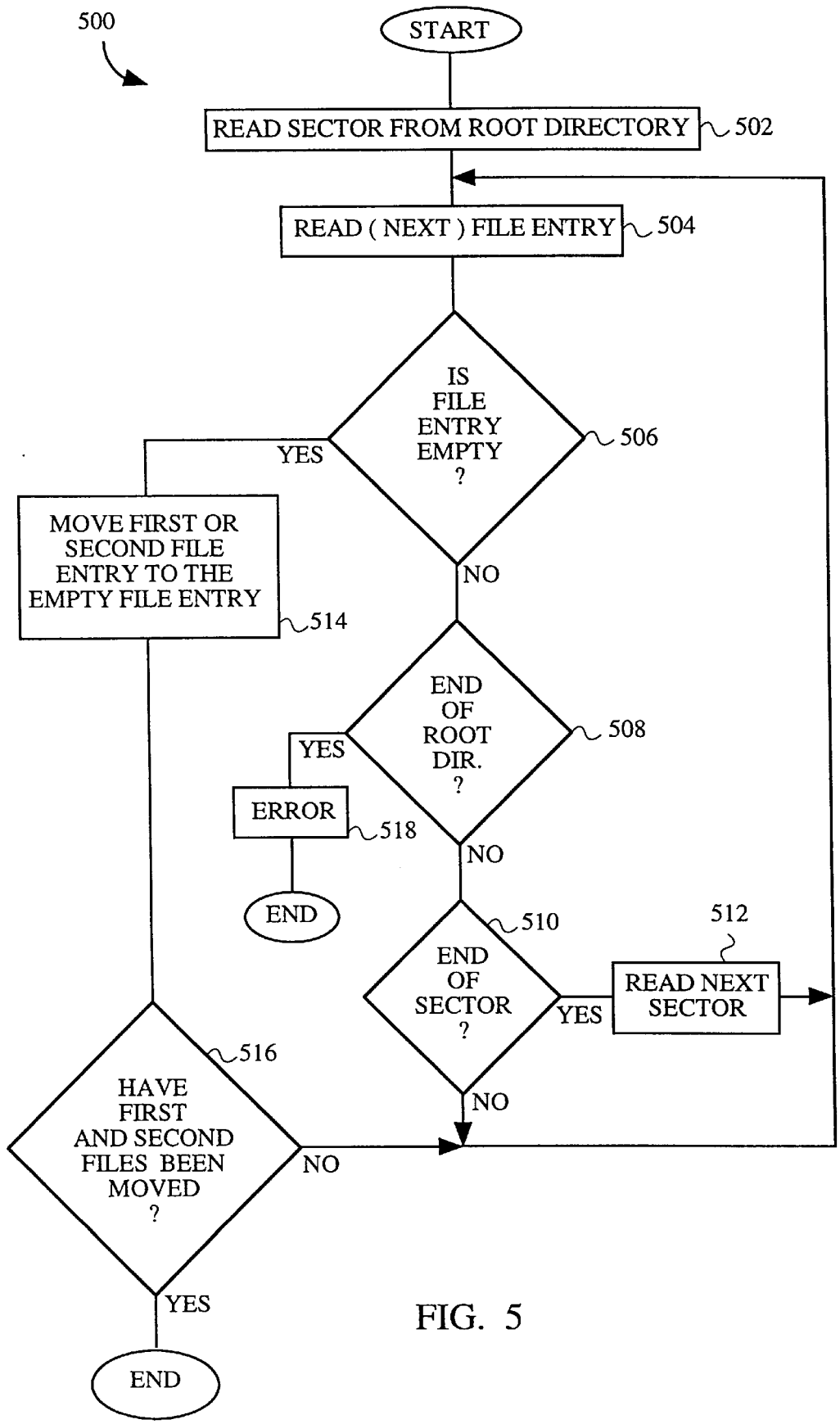
FIG. 5 is a flow diagram of file rearrangement processing according to an embodiment of the invention.

FIG. 5 is a flow diagram of file rearrangement processing 500 according to an embodiment of the invention. The file rearrangement processing 500 assumes that the first and second entries of the root directory both need to be moved out of the first and second entries into other available entries within the root directory so as to make room for files required by a DOS-based operating system.

The file rearrangement processing 500 initially reads 502 a sector from the root directory. The first sector of the root directory is the initial sector read. Then, a file entry is read 504. Initially, the first file entry that is read is the third file entry of the first sector, but for all subsequent sectors the first file entry that is read is the first file entry. Next, a decision block 506 determines whether the file entry that has been read is empty. If the decision block 506 determines that the file entry that has been read is not empty (i.e., its initial byte is not 0xE5), then a decision block 508 determines whether the end of the root directory has been reached (i.e., initial byte is 0x00). As long as the end of the root directory has not been reached, then additional entries are potentially available and thus the file rearrangement processing 500 continues with a decision block 510. The decision block 510 determines whether the end of a sector has been reached. If the end of the sector has been reached, the next sector is read 512. On the other hand, if the end of the sector has not been reached, then there is no need to read the next sector and the block 512 is bypassed. In any event, following block 512 when the end of the sector has been reached or following the decision block 510 when the end of the sector has not been reached, the file rearrangement processing 500 returns to repeat block 504 and subsequent blocks. Upon repeating block 504 and subsequent blocks, the next file entry is read and the processing continues.

When the decision block 506 eventually determines that the file entry being considered is empty, then the file rearrangement processing 500 operates to move the first or second file entry to the empty file entry 514. Then, the decision blocked 516 determines whether both the first and second files have been moved. If the first and second files have both been moved, then the file rearrangement processing 500 is complete and ends. On the other hand, if both the first and second files have not been moved, then the file rearrangement processing 500 returns to repeat block 504 and subsequent blocks until both the first and second files have been moved or until the decision block 508 determines that the end of the root directory has been reached. When the decision block 508 determines that the end of the root directory has been reached, the file rearrangement processing 500 ends with an error condition 518 because the file rearrangement processing 500 was unable to move both of the first and second files.

Figure 6A:
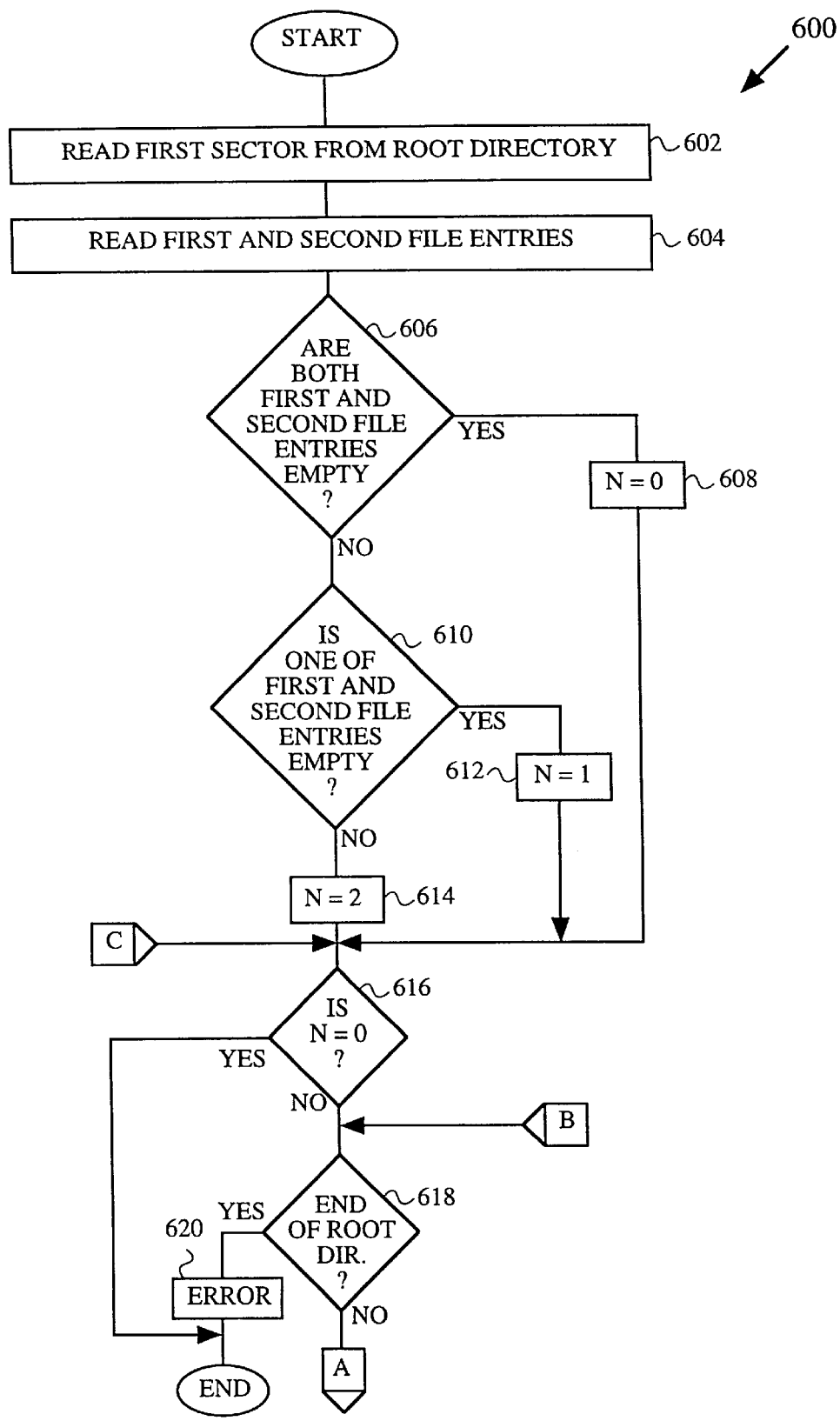
FIGS. 6A and 6B are flow diagrams of detailed file rearrangement processing according to an embodiment of the invention.
Figure 6B:
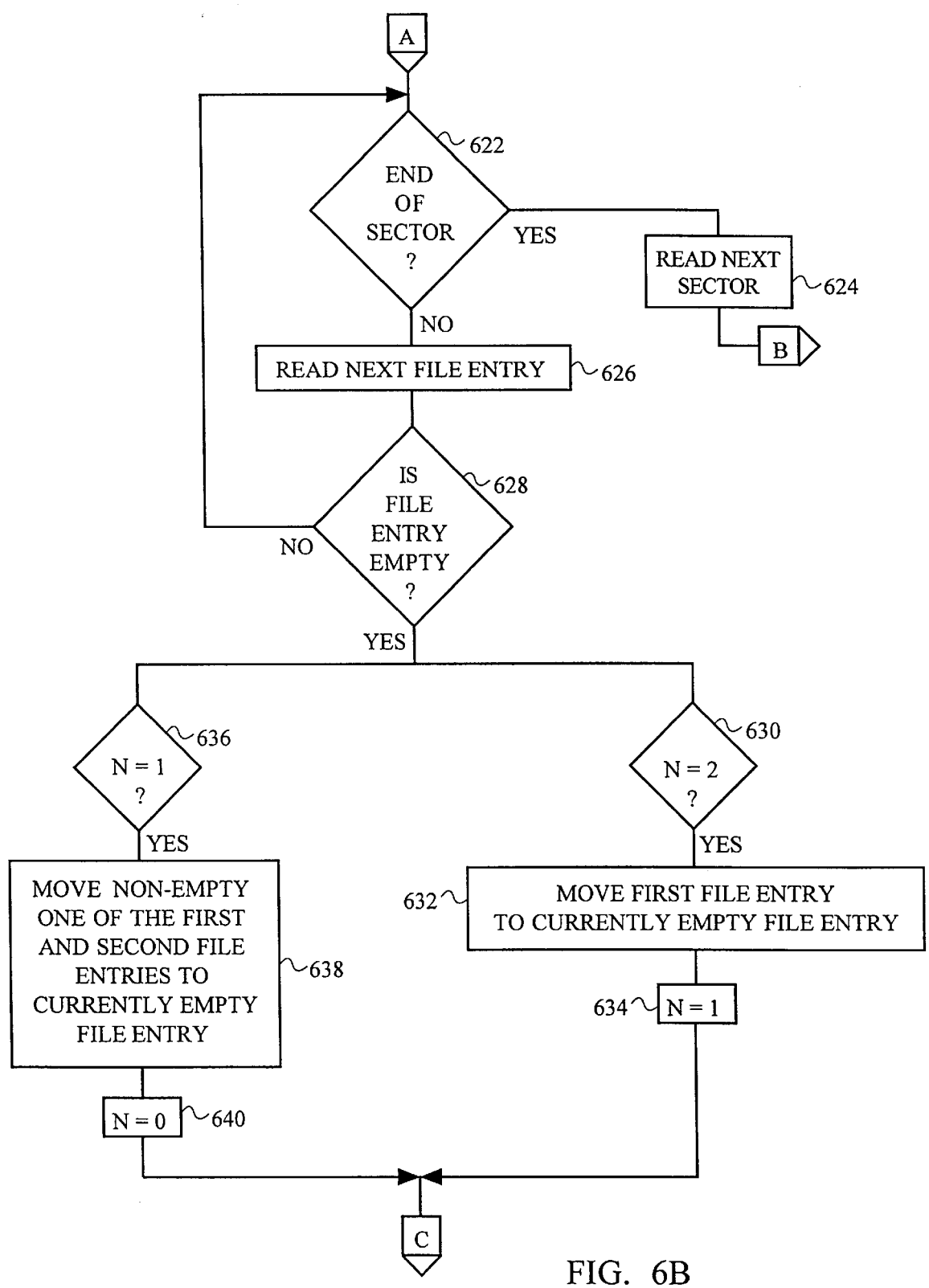

FIGS. 6A and 6B are flow diagrams of detailed file rearrangement processing 600 according to an embodiment of the invention. The detailed file rearrangement processing 600 initially reads 602 a first sector from the root directory. The first sector that has been read 602 is stored in memory. Next, first and second file entries are read 604 from the first sector of the root directory that has been read into memory.

A decision block 606 then determines whether both the first and second file entries are empty. If the decision block 606 determines that both the first and second file entries are not empty, then a decision block 610 determines whether one of the first and second file entries are empty. Based on the decisions of the decision blocks 606 and 610, an integer N is set to a value indicating the number of files that need to be moved or rearranged. Specifically, if neither the first and second file entries are empty, then the integer N is set to "2" 614. If only one of the first and second file entries are empty, then the integer N is set to "1" 612. If both the first and second file entries are empty, then the integer N is set to "0" 608. In any case, following the blocks 608, 612 and 614, the detailed file rearrangement processing 600 continues.

Next, a decision block 610 determines whether the integer N equals zero. If the decision block 610 determines that the integer N equals zero, then the detailed file rearrangement processing 600 is complete and ends because no files need to be moved or rearranged. On the other hand, when the decision block 616 determines that the integer N is not equal to zero, then the detailed file rearrangement processing 600 continues because at least one file needs to be moved or rearranged.

A decision block 618 determines whether the end of the root directory has been reached. If the end of the root directory has been reached, then an error condition 620 is signaled and the detailed file rearrangement processing 600 is complete and ends with an error condition 620 because at least one of the first and second file entries that was required to be moved cannot be moved properly. On the other hand, when the end of the root directory has not been reached, then a decision block 622 determines whether the end of the sector has been reached. If the end of the sector has been reached, then the next sector is read 624 into memory and the processing returns to repeat block 618 and subsequent blocks. On the other hand, when the decision block 622 determines that the end of the sector has not been reached, the next file entry is read 624 from the sector currently held in the memory.

A decision block 628 then determines whether the file entry that has been read 626 is empty. If the file that has been read 626 is determined not to be empty, then the processing returns to repeat block 622 and subsequent blocks to check the next file entry to see if it is empty.

On the other hand, when the decision block 628 determines that the file entry that has been read 626 is empty, the detailed file rearrangement processing 600 continues to operate so as to move or rearrange the file from one of the first and second file entries of the first sector (also read 602 into the memory) to the empty file entry that has been identified. In particular, a decision block 630 determines whether the integer N equals two. If the decision block 630 determines that the integer N equals two, then the first file entry is moved 632 to the currently empty file entry that has been identified. Then, the integer N is set 634 to one. Alternatively, if a decision block 636 determines that the integer N equals one, then the non-empty one of the first and second file entries is moved 638 to the currently empty file entry. Then, the integer N is set 640 to zero. Thereafter, following either block 634 or 640, the detailed file rearrangement processing 600 returns to repeat block 616 and subsequent blocks.

Once the decision block 616 determines that the integer N equals zero, then the detailed file rearrangement processing 600 is complete and ends because the file entries from the first and second file entries of the first sector of the root directory that were required to be moved have been moved. Hence, following performance of the detailed file rearrangement processing 600, the first and second file entries of the root directory are unoccupied and can thus receive the files required by a DOS-based operating system (e.g., IO.SYS and MS-DOS.SYS files).

The invention employs various computer-implemented operations involving data stored in computer systems or on data storage mediums. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 7:
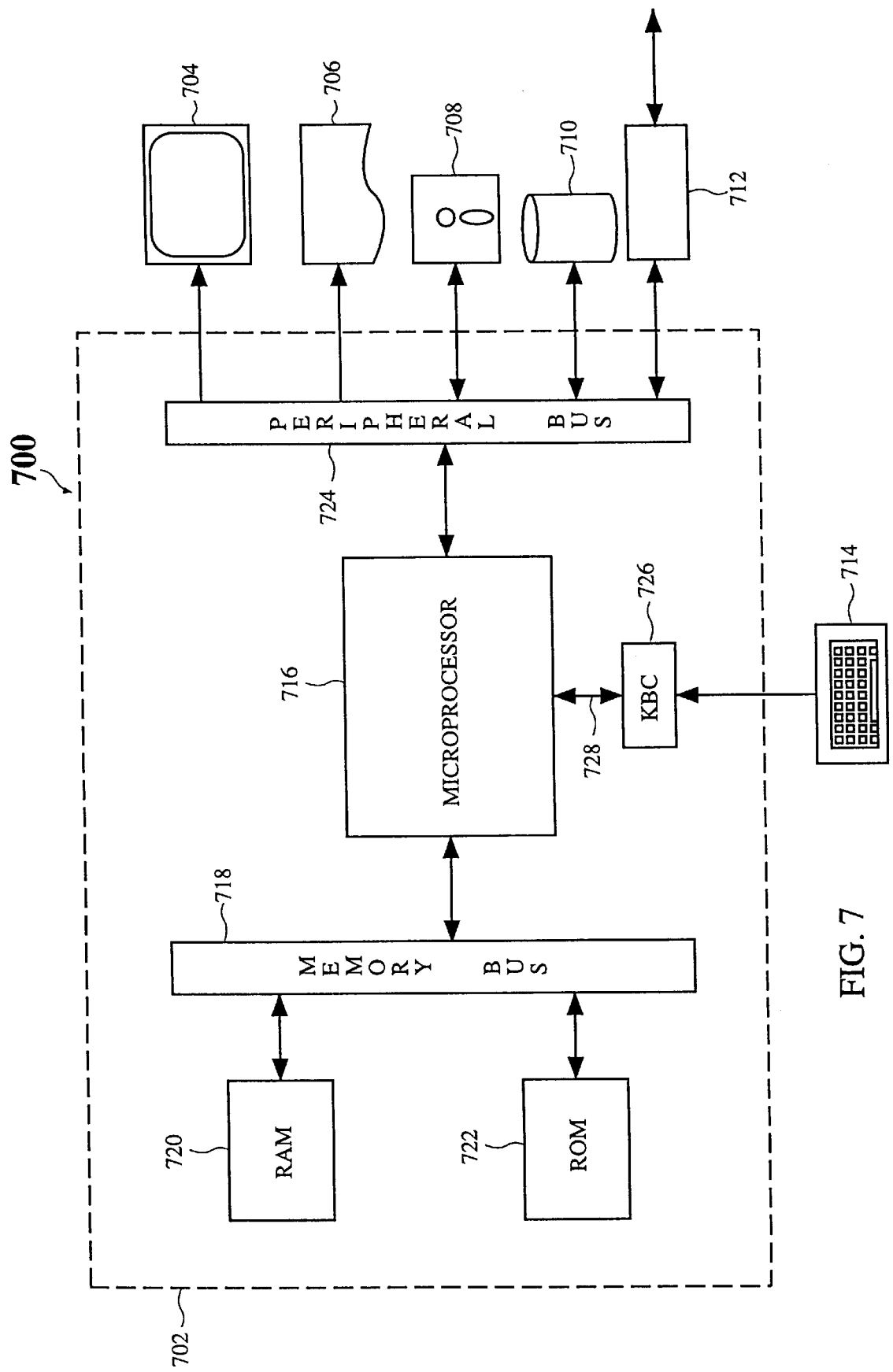
FIG. 7 is a block diagram of an exemplary computer system for carrying out the processing according to the invention.

FIG. 7 is a block diagram of an exemplary computer system 700 for carrying out the processing according to the invention. The computer system 700 includes a digital computer 702, a display screen (or monitor) 704, a printer 706, a floppy disk drive 708, a hard disk drive 710, a network interface 712, and a keyboard 714. The digital computer 702 includes a microprocessor 716, a memory bus 718, random access memory (RAM) 720, read only memory (ROM) 722, a peripheral bus 724, and a keyboard controller 726. The digital computer 700 can be a personal computer (such as an IBM compatible personal computer).

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 provides dual booting capabilities to the computer system 700.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710, and the network interface 712. The keyboard controller 726 is used to receive input from keyboard 714 and send decoded symbols for each pressed key to microprocessor 716 over bus 728.

The display screen 704 is an output device that displays images of data provided by the microprocessor 716 via the peripheral bus 724 or provided by other components in the computer system 700. The printer device 706 when operating as a printer provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 720. The computer code and data could also reside on a removable computer readable medium and loaded or installed onto the computer system 700 when needed. Removable program mediums include, for example, CD-ROM, PC-CARD, floppy disk and magnetic tape.

The network interface 712 is used to send and receive data over a network connected to other computer systems. An interface card or similar device and appropriate software implemented by the microprocessor 716 can be used to connect the computer system 700 to an existing network and transfer data according to standard protocols.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, floppy disks, optical data storage devices. The computer readable medium can also be distributed over a network coupled computer systems so that the computer readable code is stored and executed in a distributed fashion.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for installing on a computer system a DOS-based operating system after installation of a Windows NT operating system, said method comprising:
    (a) retrieving a DOS boot sector from a DOS diskette, the DOS boot sector including at least a bootstrap routine for booting in DOS;
    (b) retrieving an installed boot sector from a boot drive of a computer system, the installed boot sector including drive information;
    (c) merging the DOS boot sector with the installed boot sector to produce a modified boot sector;
    (d) replacing the installed boot sector with the modified boot sector; and
    (e) copying certain files from the DOS diskette to predetermined entries in a root directory of the boot drive.

2. A method as recited in claim 1, wherein said copying (e) operates to copy first and second files from the DOS diskette to first and second entries in the root directory of the boot drive.

3. A method as recited in claim 2, wherein the first file is IO.SYS, and the second file is MSDOS.SYS.

4. A method as recited in claim 3, wherein said method further comprises:
    (f) copying a third file from the DOS diskette to the boot drive.

5. A method as recited in claim 2, wherein said copying (e) includes the operations of:
    moving files from the first and second entries in the root directory to available other entries in the root directory of the boot drive; and
    subsequently, copying first and second files from the DOS diskette to first and second entries in the root directory of the boot drive.

6. A method as recited in claim 2, wherein the modified boot sector includes at least the drive information from the installed boot sector and the bootstrap routine from the DOS diskette.

7. A method as recited in claim 6, wherein said wherein said merging (c) includes the operations of:
    masking out a drive information section from the DOS boot sector retrieved from the DOS diskette; and
    placing the drive information from the installed boot sector into the drive information section of the DOS boot sector retrieved from the DOS diskette.

8. A method as recited in claim 6, wherein the drive information section is provided in bytes $0B_{HEX}$ to $3E_{HEX}$ of the DOS boot sector.

9. A method as recited in claim 1, wherein the DOS-based operating system is DOS.

10. A method as recited in claim 1, wherein the DOS-based operating system is MS-DOS.

11. A method as recited in claim 1, wherein the DOS-based operating system is Windows.

12. A method for installing a second operating system on a computer system after a first operating system has been previously installed, said method comprising:
    (a) retrieving an uninstalled boot sector including at least second drive information and a bootstrap routine for booting the computer system in the second operating system;
    (b) retrieving an installed boot sector from a boot drive of the computer system, the installed boot sector including at least first drive information, the installed boot sector being used to boot the computer system in the first operating system;
    (c) merging the uninstalled boot sector with the installed boot sector to produce a modified boot sector; and
    (d) replacing the installed boot sector with the modified boot sector.

13. A method as recited in claim 12, wherein said retrieving (a) retrieves the uninstalled boot sector from a portable computer readable medium, and
    wherein said method further comprises:
    (e) copying certain files from the DOS diskette to predetermined entries in a root directory of the boot drive of the computer system.

14. A computer readable medium containing program instructions for installing on a computer system a DOS-based operating system after installation of a Windows NT operating system, said computer readable medium comprising:
    computer readable code for retrieving a DOS boot sector from a DOS diskette, the DOS boot sector including at least a bootstrap routine for booting in DOS;
    computer readable code for retrieving an installed boot sector from a boot drive of a computer system, the installed boot sector including drive information;
    computer readable code for merging the DOS boot sector with the installed boot sector to produce a modified boot sector;
    computer readable code for replacing the installed boot sector with the modified boot sector; and
    computer readable code for copying certain files from the DOS diskette to predetermined entries in a root directory of the boot drive.

15. A computer readable medium as recited in claim 14, wherein said computer readable code for copying the certain files operates to copy first and second files from the DOS diskette to first and second entries in the root directory of the boot drive.

16. A computer readable medium as recited in claim 15, wherein said computer readable medium further comprises:

computer readable code for copying a third file from the DOS diskette to the boot drive.

17. A computer readable medium as recited in claim 15, wherein said computer readable code for copying the certain files comprises:

computer readable code for moving files from the first and second entries in the root directory to available other entries in the root directory of the boot drive; and computer readable code for subsequently copying first and second files from the DOS diskette to first and second entries in the root directory of the boot drive.

18. A computer readable medium as recited in claim 14, wherein the modified boot sector includes at least the drive information from the installed boot sector and the bootstrap routine from the DOS diskette.

19. A computer readable medium as recited in claim 15, wherein said computer readable medium further comprises:

computer readable code for masking out a drive information section from the DOS boot sector retrieved from the DOS diskette; and computer readable code for placing the drive information from the installed boot sector into the drive information section of the DOS boot sector retrieved from the DOS diskette.

20. A computer readable medium as recited in claim 15, wherein the drive information section is provided in bytes $0B_{HEX}$ to $3E_{HEX}$ of the DOS boot sector, wherein the first file is IO.SYS, and the second file is MSDOS.SYS, and wherein the DOS-based operating system is one of DOS, MS-DOS and Windows.

* * * * *